United States Patent
Ikehashi

(10) Patent No.: US 8,013,667 B2
(45) Date of Patent: Sep. 6, 2011

(54) VOLTAGE GENERATING CIRCUIT FOR ELECTROSTATIC MEMS ACTUATOR

(75) Inventor: Tamio Ikehashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 51 days.

(21) Appl. No.: 12/649,809

(22) Filed: Dec. 30, 2009

(65) Prior Publication Data

US 2010/0237929 A1    Sep. 23, 2010

(30) Foreign Application Priority Data

Mar. 18, 2009  (JP) .................................. 2009-066638

(51) Int. Cl.
*G05F 1/10* (2006.01)

(52) U.S. Cl. ...................................................... 327/536

(58) Field of Classification Search .................. 327/535, 327/536, 537
See application file for complete search history.

(56) References Cited

U.S. PATENT DOCUMENTS

| | | | | |
|---|---|---|---|---|
| 6,834,001 B2 * | 12/2004 | Myono | ............................. | 363/60 |
| 7,190,210 B2 * | 3/2007 | Azrai et al. | .................... | 327/536 |
| 7,279,957 B2 * | 10/2007 | Yen | ................................ | 327/536 |
| 7,382,634 B2 * | 6/2008 | Buchmann | ....................... | 363/59 |

FOREIGN PATENT DOCUMENTS

| | | |
|---|---|---|
| JP | 2004-112944 | 4/2004 |
| JP | 2004-242487 | 8/2004 |
| JP | 2008-134097 | 6/2008 |

* cited by examiner

*Primary Examiner* — Jeffrey S Zweizig
(74) *Attorney, Agent, or Firm* — Oblon, Spivak, McClelland, Maier & Neustadt, L.L.P.

(57) ABSTRACT

A plurality of capacitors each of which has a first and a second electrode. A plurality of first switches is connected between the first electrodes of the plurality of capacitors and a first power supply. A plurality of second switches is connected between the second electrodes of the plurality of capacitors and a second power supply. A plurality of resistances each of which is connected between the first electrode of one of the plurality of capacitors and the second electrode of another capacitor and which connect the plurality of capacitors in series, a voltage for driving an actuator being output from the last stage of the plurality of capacitors connected in series.

18 Claims, 5 Drawing Sheets

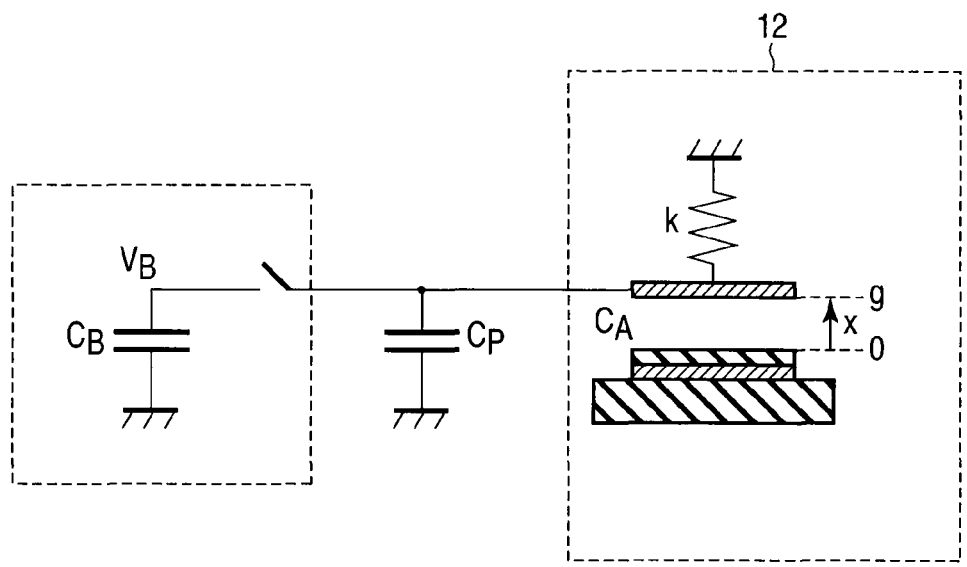
F I G. 2
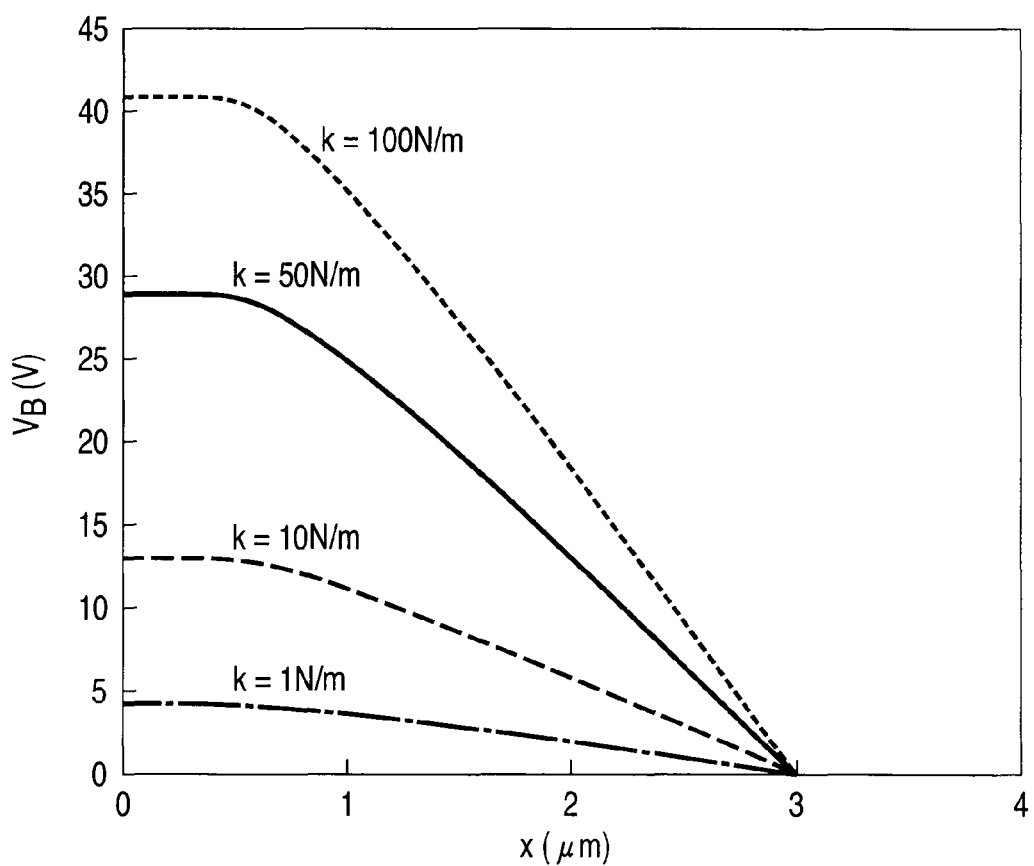
F I G. 3

| Spring constant | k | 50 | N/m |
|---|---|---|---|
| Equivalent capacitance of all capacitors | $C_B$ | 2.00E-12 | F |
| Parasitic capacitance | $C_p$ | 3.00E-13 | F |
| Electric constant | $\varepsilon_0$ | 8.85E-12 | |
| Area of electrode | S | 1.00E-08 | $m^2$ |
| Film thickness of dielectric | d | 2.00E-07 | m |
| Permittivity | er | 7.50E+00 | |
| Effective film thickness | deff = d/er | 2.67E-08 | m |
| Up-state gap | g | 3.00E-06 | m |
F I G. 4
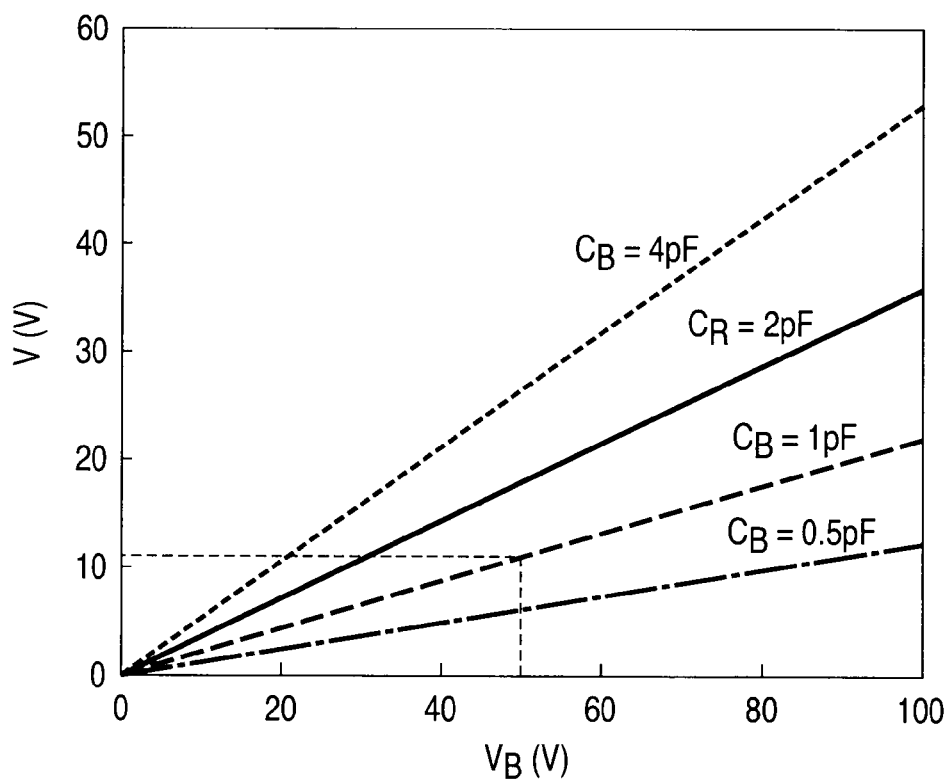
F I G. 5

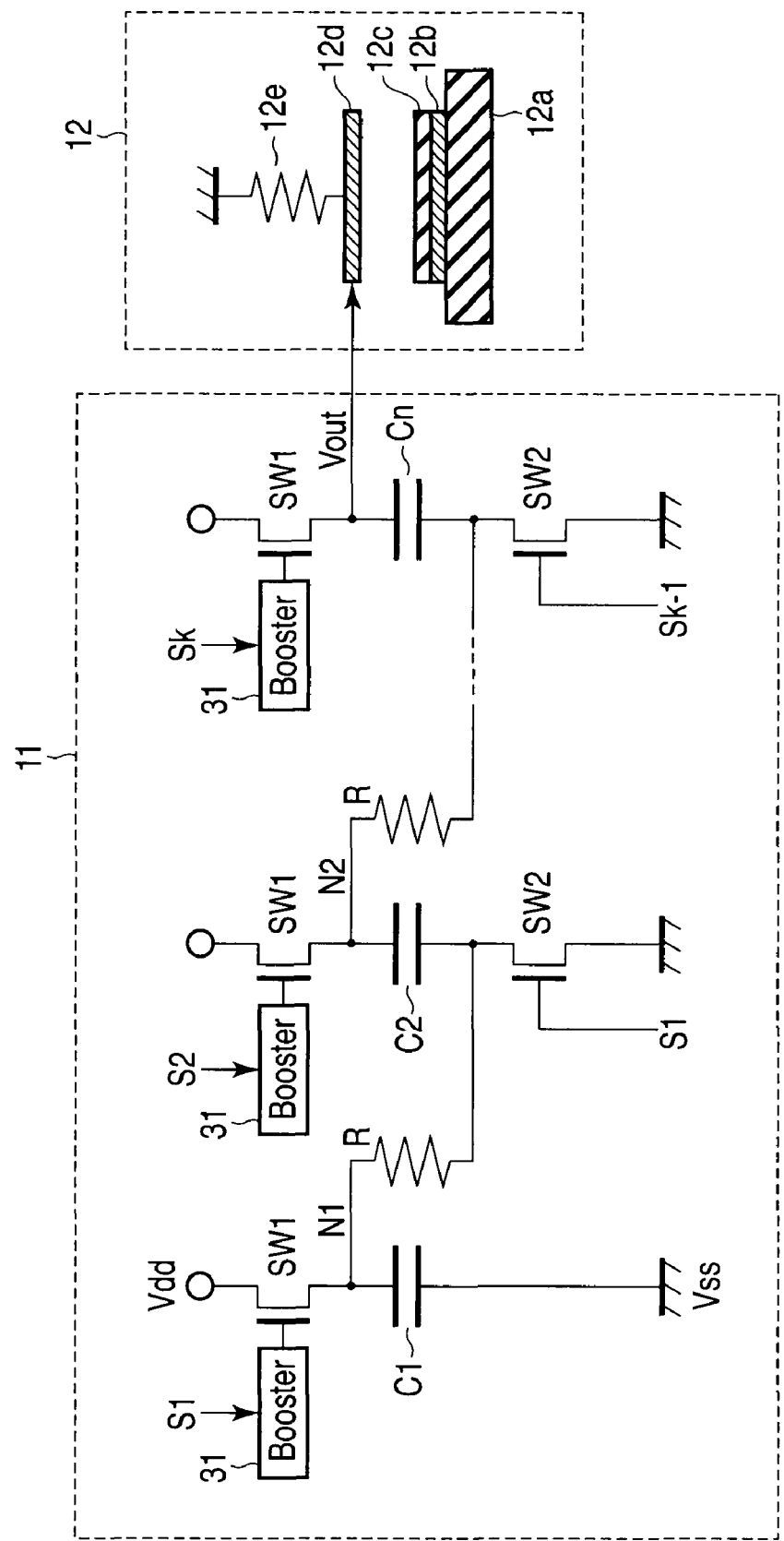
F I G. 8

VOLTAGE GENERATING CIRCUIT FOR ELECTROSTATIC MEMS ACTUATOR

CROSS-REFERENCE TO RELATED APPLICATIONS

This application is based upon and claims the benefit of priority from prior Japanese Patent Application No. 2009-066638, filed Mar. 18, 2009, the entire contents of which are incorporated herein by reference.

BACKGROUND

In realizing electronic components, for example, a radio-frequency micro-electromechanical system (RF-MEMS) variable capacitance using MEMS techniques and an electrostatic actuator applied to RF-MEMS switches have been developed. The electrostatic actuator has the problem of being slow in switching speed. An electrostatic actuator with a driving voltage of about 20 V has a switching time as slow as about 20 μs, which narrows the range of application of RF-MEMS.

The driving voltage of the electrostatic actuator is generated by a step-up circuit provided in a semiconductor device (e.g., refer to JP 2004-112944). To shorten the switching time of the electrostatic actuator, the driving voltage has to be raised. However, it takes time to generate a high voltage with the step-up circuit of the semiconductor device. Accordingly, it is difficult to shorten the total time required for the switching of the electrostatic actuator. In addition, if the electrostatic actuator is driven at a high voltage, the number of stictions due to charging increases, which makes faults liable to occur. Therefore, it has been demanded that a high voltage necessary to drive an electrostatic actuator in a short time can be generated and charging is made less liable to occur.

SUMMARY

According to a first aspect of the invention, there is provided a voltage generating circuit comprising: a plurality of capacitors each of which includes a first and a second electrode; a plurality of first switches connected between the first electrodes of the plurality of capacitors and a first power supply; a plurality of second switches connected between the second electrodes of the plurality of capacitors and a second power supply; and a plurality of resistances each of which is connected between the first electrode of one of the plurality of capacitors and the second electrode of another capacitor and which connect the plurality of capacitors in series, wherein a voltage for driving an actuator is output from a last stage of the plurality of capacitors connected in series.

According to a second aspect of the invention, there is provided a driving system comprising: a first step-up circuit; and an actuator connected to the output end of the first step-up circuit, the first step-up circuit comprising: a plurality of capacitors each of which includes a first and a second electrode; a plurality of first switches connected between the first electrodes of the plurality of capacitors and a first power supply; a plurality of second switches connected between the second electrodes of the plurality of capacitors and a second power supply; and a plurality of resistances each of which is connected between the first electrode of one of the plurality of capacitors and the second electrode of another capacitor and which connect the plurality of capacitors in series, a voltage for driving an actuator being output from the output end at a last stage of the plurality of capacitors connected in series.

BRIEF DESCRIPTION OF THE DRAWING

FIG. 2 shows an equivalent circuit of the circuit shown in FIG. 1;

FIG. 3 shows driving voltages of an actuator;

FIG. 4 shows the requirements for deriving the relationship of FIG. 3;

FIG. 5 shows voltages after the actuator is driven;

FIG. 8 schematically shows a configuration of a step-up circuit according to a third embodiment of the invention.

DETAILED DESCRIPTION OF THE INVENTION

Hereinafter, referring to the accompanying drawings, embodiments of the invention will be explained.

First Embodiment

Figure 1:
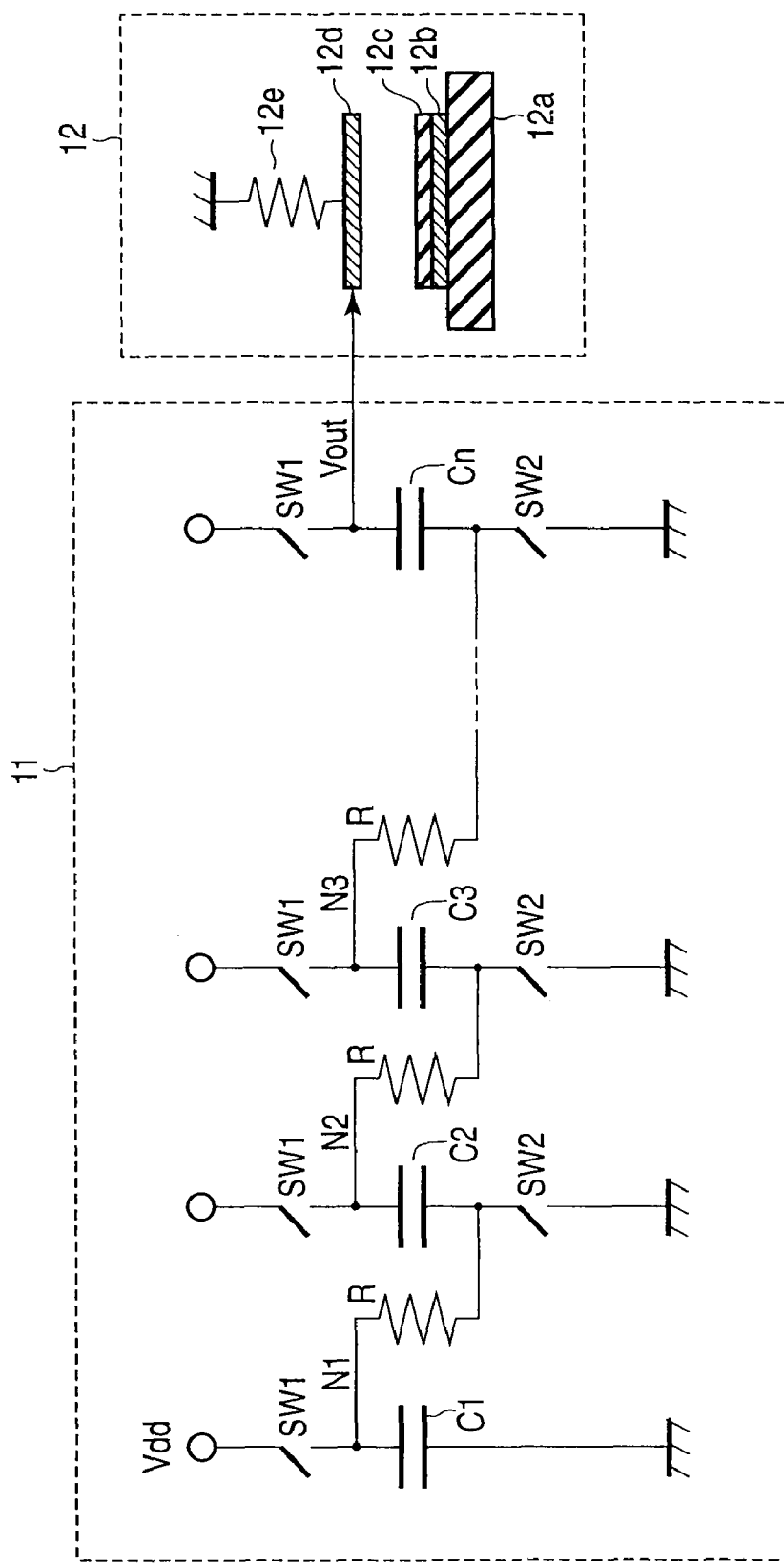
FIG. 1 schematically shows a configuration of a step-up circuit according to a first embodiment of the invention.

FIG. 1 shows a step-up circuit 11 according to a first embodiment of the invention. In FIG. 1, a plurality of first switches SW1 are connected between first electrodes of a plurality of capacitors C1, C2, C3, . . . , Cn and a first power supply Vdd in a one-to-one correspondence. A plurality of second switches SW2 are connected between second electrodes of a plurality of capacitors C2, . . . , Cn and a second power supply Vss, such as the ground, in a one-to-one correspondence. A resistance R is connected between the first electrode of a capacitor and the second electrode of an adjacent capacitor. Consequently, the plurality of capacitors C1, . . . , Cn are connected in series via the plurality of resistances R. A driving voltage Vout for an electrostatic actuator 12 is output from the first electrode of the last-stage one Cn of the plurality of capacitors connected in series.

While in FIG. 1, the second switch SW2 is not connected to capacitor C1, the second switch SW2 may be connected to capacitor C1.

The electrostatic actuator 12 includes a first electrode 12b formed on, for example, an insulating film 12a, an insulating film 12c formed on the first electrode 12b, a second electrode 12d provided above the insulating film 12c so as to move upward freely, and an elastic body 12e. An output voltage Vout of the step-up circuit 11 is supplied to, for example, the second electrode 12d. The step-up circuit 11 and electrostatic actuator 12 are formed on, for example, the same substrate.

The resistances of the plurality of resistances R are the same. They are set sufficiently higher than the on resistances of, for example, the first and second switches SW1, SW2. They are further set so that the delay time determined by resistance R and the parasitic capacitance of a wire constituting resistance R may be sufficiently short. The resistance of resistance R will be described later.

The step-up circuit 11 configured as described above switches the parallel connection of capacitors C1, . . . , Cn to the series connection of capacitors C1, . . . , Cn only once, thereby driving the electrostatic actuator 12. That is, first, the first and second switches SW1, SW2 are turned on, thereby connecting capacitors C1, . . . , Cn in parallel. Thereafter, the first and second switches SW1, SW2 are turned off, with the result that capacitors C1, . . . , Cn are connected in series via a plurality of resistances R. As a result, a high voltage can be output instantaneously at the output end. Accordingly, the electrostatic actuator 12 can be switched at high speed.

Next, conditions under which the step-up circuit 11 drives the electrostatic MEMS actuator 12 will be explained.

The first and second switches SW1, SW2 are turned on, thereby connecting the plurality of capacitors C1, ..., Cn in parallel. Thereafter, the first and second switches SW1, SW2 are turned off, thereby causing the plurality of capacitors C1, ..., Cn to be connected in series via a plurality of resistances R. In this state, suppose an equivalent capacitance of an n number of capacitors C1, ..., Cn is $C_B$ and the generated high voltage is $V_B$. If the capacitance of each of capacitors C1, ..., Cn is C and a parasitic capacitance $C_P$ is ignored, these relationships are represented by the following equations:

$$V_B = nVdd, \quad C_B = C/n$$

A condition under which the actuator can be driven with $V_B$ and $C_B$ will be considered. The condition is equivalent to a condition under which a switch is closed in a state where voltage $V_B$ is accumulated to capacitance $C_B$, which enables the actuator to be driven.

FIG. 2 is an equivalent circuit of the circuit shown in FIG. 1. Suppose the actuator capacitance and parasitic capacitance when the interelectrode distance of the actuator 12 is x are $C_A(x)$ and $C_P$, respectively. In addition, k is a spring constant. In an initial state where there is no potential difference between electrodes, x=g holds. Equation (1) represents the relationship of energy conservation. Equation (2) represents the relationship of charge conservation. In equations (1) and (2), the loss caused by resistances R and damping is neglected. Solving the conservation equations (1) and (2) gives equation (3):

$$\frac{1}{2}C_B V_B^2 = \frac{1}{2}k(x-g)^2 + \frac{1}{2}C_A(x)V^2 + \frac{1}{2}C_B V^2 + \frac{1}{2}C_P V^2 \quad (1)$$

$$C_B V_B = C_A(x)V + C_B V + C_P V \quad (2)$$

$$V_B = \sqrt{\frac{k}{C_B}\left[\frac{C_A(x)+C_P+C_B}{C_A(x)+C_P}\right]} \cdot |x-g| \quad (3)$$

Here, while $C_B = C/n$ holds, if n is sufficiently large, $C_B \ll C_A(x)$ holds. If x=0, then equation (3) is changed to equation (4):

$$V_B \geq \sqrt{\frac{k}{C_B}} \cdot g \quad (4)$$

The driving voltage (or pull-in voltage) $V_{IP}$ of the actuator 12 is expressed by equation (5):

$$V_{PI} = \sqrt{\frac{8kg^3}{27\varepsilon_0 S}} = \sqrt{\frac{8k}{27C_{UP}}} \, g \quad (5)$$

where $C_{UP}$ is the capacitance when the actuator 12 is in the up state (or when the actuator is not driven), $\varepsilon_0$ is the electric constant, and S is an area of the electrode. $C_{UP}$ is expressed by equation (6):

$$C_{UP} \equiv \frac{\varepsilon_0 S}{g} \cong C_A(g) \quad (6)$$

Rearranging equation (4) by use of equation (5) gives expression (7):

$$V_B \geq \sqrt{\frac{27}{8}} \sqrt{\frac{C_{UP}}{C_B}} V_{PI} \quad (7)$$

As described above, rearranging expression (7) on the basis of $V_B = nVdd$ and $C_B = C/n$ gives expression (8)

$$C \times n \geq \frac{27}{8}\left(\frac{V_{PI}}{Vdd}\right)^2 C_{UP} \quad (8)$$

where C: the capacitance of a capacitor n: the number of capacitors

Vdd: the supply voltage to the step-up circuit $V_{P1}$: the pull-in voltage of the actuator $C_{UP}$: the up-state capacitance of the actuator Expression (8) represents the condition for C and n of the step-up circuit to drive the actuator 12 by one switching action.

FIG. 3 shows the relationship expressed by equation (3). FIG. 4 shows the requirements used to calculate the relationship of FIG. 3. From FIG. 3, it is seen that, in a case where the spring constant of the actuator 12 is k=50 N/m, if $V_B$>30V, the gap between electrodes of the actuator 12 can be made zero after the switch is closed. That is, it is seen that the actuator 12 can be driven.

After the actuator 12 is driven (or pulled in), the actuator capacitance $C_A(x)$ (=$C_A(0)$) increases. Accordingly, the voltage applied to the actuator 12 decreases due to charge sharing.

FIG. 5 shows how the voltage applied to the actuator 12 decreases due to charge sharing. The voltage decreases on the basis of equation (9):

$$V = \frac{C_B}{C_A(0)+C_B+C_P} V_B \quad (9)$$

As shown in FIG. 5, for example, when $C_B$=1 pF, after the actuator 12 is pulled in even with $V_B$=50 V, the voltage applied to the actuator 12 is 11 V. Accordingly, the first embodiment can suppress charging.

Next, the resistance of resistance R will be explained. The lower limit of the resistance of one resistance R is determined by two factors. A first factor is to increase the efficiency by decreasing the number of stages of step-up circuits. A second factor is to decrease the total amount of through current.

In the first factor, when the efficiency is increased by decreasing the number of step-up circuits, it is desirable that the potential difference ΔV applied to one capacitor should be close to the voltage of the first power supply Vdd. Accordingly, if the on resistance of each of the switches SW1 to SWn is $R_{SW}$ and the resistance R of the resistance is R, the potential difference ΔV applied to each capacitor is expressed as equation (10):

$$\Delta V = \frac{R}{R + 2R_{SW}} Vdd \quad (10)$$

If $\Delta V$ is 90% or more of Vdd, there is no problem in practical use. Consequently, the relationship between the resistance R and the resistance $R_{SW}$ of the switch SW is represented as expression (11):

$$R \geq 18 \cdot R_{SW} \quad (11)$$

Next, the total amount of through current which is the second factor determining the lower limit of the resistance will be explained. If the resistance of resistance R is too low, the total amount of through current between the first power supply Vdd and the second power supply Vss increases, causing the power supply voltage to drop, which makes the circuit to operate erroneously. Therefore, through current Ithr per stage of step-up circuit has to have a magnitude expressed by equation (12):

$$Ithr = \frac{Vdd}{R + 2R_{SW}} \quad (12)$$

If the lower limit of the total amount of through current that permits the step-up circuit to operate erroneously is Ilim, a condition for through current in a step-up circuit composed of an n number of capacitors to prevent an erroneous operation is represented as expression (13):

$$NIthr < Ilim \quad (13)$$

Accordingly, the lower limit of the resistance R is represented by expression (14):

$$R \geq \frac{nVdd}{Ilim} - 2R_{SW} \quad (14)$$

When taken together, the lower limit of the resistance R is represented as expression (15):

$$R \geq \mathrm{Max}\left(18 R_{SW}, \frac{nVdd}{Ilim} - 2R_{SW}\right) \quad (15)$$

The upper limit of the resistance R is determined by a time constant RC determined by a resistance R and a parasitic capacitance $C_P$. The parasitic capacitance CP is the parasitic capacitance of a wire composed of, for example, a polysilicon layer constituting a resistance R. Since the driving speed of MEMS is about 10 µs, if the time constant RC is equal to or less than 1/10 of 10 µs, there is no problem in practical use. Accordingly, the upper limit of the resistance R is represented as expression (16):

$$R \leq 1\ \mu sec/C_P \quad (16)$$

Specifically, for example, if the number of stages n=20, Vdd=3 V, $R_{SW}$=1000Ω, Ilim=10 mA, and Cp=2 pF, the lower limit of the resistance R is 18 kΩ and the upper limit is 500 kΩ. Therefore, the range of the resistance R is as follows:

$$18\ k\Omega \leq R \leq 500\ k\Omega$$

According to the first embodiment, the plurality of first switches SW1 are connected between the first electrodes of the plurality of capacitors C1, C2, C3, ..., Cn and the first power supply Vdd, the plurality of second switches SW2 are connected between the second electrodes of the plurality of capacitors C1, ..., Cn and the second power supply Vss, and a resistance R is connected between the first electrode of a capacitor and the second electrode of an adjacent capacitor. Therefore, the effect of a voltage drop caused by the threshold voltage of the MOS transistor can be eliminated as when a switch composed of MOS transistors is provided between the first electrode of a capacitor and the second electrode of an adjacent capacitor in a conventional equivalent. In addition, there is no need to generate a voltage to control the gate electrode of the MOS transistor. Accordingly, the circuit configuration can be simplified.

Furthermore, optimizing the resistance enables a delay due to the RC time constant to be suppressed and the driving voltage for the actuator to be produced at high speed.

Moreover, in the first embodiment, the power consumption can be reduced because useless charges are not accumulated in the capacitors as compared with a Dickson-type charge pump circuit.

Second Embodiment

While in the first embodiment, each of the first and second switches SW1, SW2 has been composed of a MOS transistor, the invention is not limited to this. For instance, each of the switches SW1, SW2 may be composed of a MEMS switch.

Figure 6:
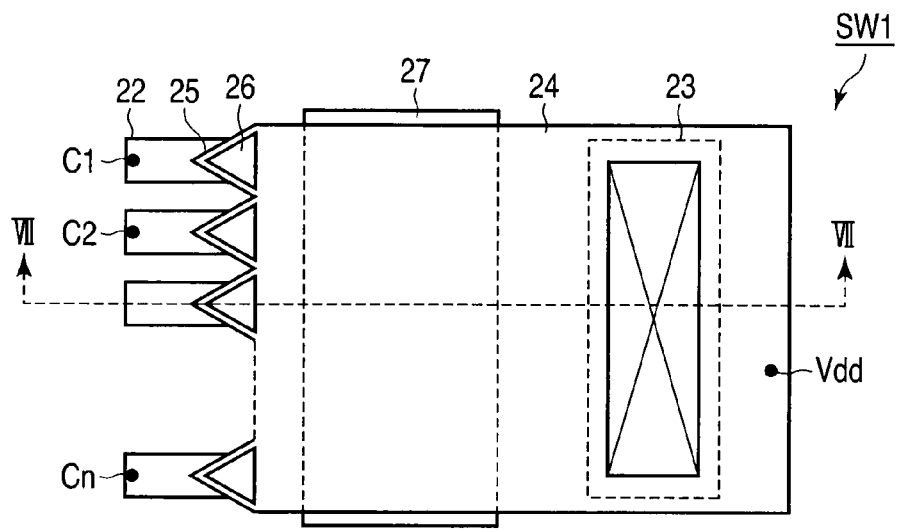
FIG. 6 is a plan view of a second embodiment of the invention.
Figure 7:
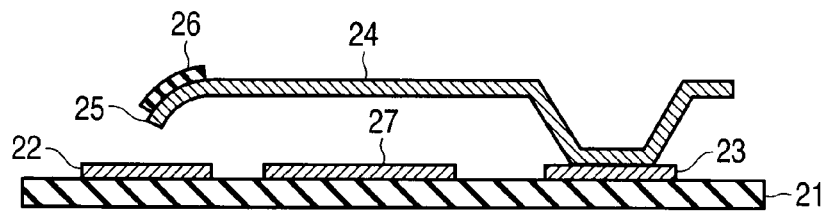
FIG. 7 is a sectional view taken along line VII-VII of FIG. 6.

FIGS. 6 and 7 show an example of a MEMS switch applied to a second embodiment of the invention. The MEMS switch constitutes a plurality of first switches SW1 shown in FIG. 1. A MEMS switch constituting the second switches SW2 has the same configuration as that of FIGS. 6 and 7.

In FIGS. 6 and 7, a plurality of fixed electrodes 22 are composed of a plurality of conducting films on an insulating film 21. A conducting film 23 is formed on the insulating film 21 so as to be separated from the fixed electrodes 22. One end of a movable electrode 24 composed of a conducting film is secured onto the conducting film 23, thereby forming an anchor. The other end of the movable electrode 24 has a plurality of contacts 25. The contacts 25 are provided above the fixed electrodes 22 so as to face the fixed electrodes with a specific distance between the contacts and the electrodes. On each of the contacts 25, an insulating film 26 is formed. On the insulating film 21 between the fixed electrodes 22 and the conducting films 23, driving electrodes 27 are composed of a conducting film. The plurality of fixed electrodes 22 are connected to the plurality of capacitors C1, C2, C3, ..., Cn and the movable electrode 24 is connected to the first power supply Vdd.

With the above configuration, when 0 V is applied to the driving electrode 27, the movable electrode 24 is in the position shown in FIG. 6 and the plurality of contacts 25 are separated from the fixed electrodes 22. Consequently, the switch is in the off state.

When a high voltage is applied to the driving electrode 27, the movable electrode 24 is electrostatically attracted to the driving electrode 27 and the plurality of contacts 25 are brought into contact with the plurality of fixed electrodes 22. As a result, the switch goes into the on state. When the application of the high voltage to the driving electrode 27 is stopped, the movable electrode 24 returns to the position of FIG. 6 by its elasticity.

When the plurality of first and second switches SW1, SW2 are composed of MEMS switches as in the second embodiment, they may be made up of two MEMS switches. Since the MEMS switch is for switching between direct-current power supplies, the gap between the contacts 25 and the fixed electrodes 25 is allowed to be narrow. Accordingly, the operating speed can be increased.

Furthermore, since the contact resistance of the contact 25 and the fixed electrode 22 is about 10 Ω, the effect of a voltage drop due to the threshold voltage of the MOS transistor can be suppressed as when a switch is composed of MOS transistors. Accordingly, the capacitors can be charged efficiently with the power supply voltage.

In addition, since the MEMS chip requires no MOS transistor in the second embodiment, the manufacturing process can be simplified.

Third Embodiment

FIG. 8 shows a third embodiment of the invention. In the third embodiment, a plurality of first switches SW1 and second switched SW2 are composed of high-voltage n-channel MOS (NMOS) transistors. The gate electrode of an NMOS transistor constituting each of the first switch SW1 is connected to the output end of the corresponding one of boosters 31. Signals S1, S2, ..., Sk are supplied to the boosters 31. The boosters 31, which have the same circuit configuration, each generate a first power supply Vdd+Vth (the threshold voltage of NMOS) according to signals S1, S2, ..., Sk. The voltage is supplied to the gate electrode of the corresponding NMOS transistor.

In addition, signals S1, S2, ..., Sk-1 are supplied to the gate electrodes of the NMOS transistors constituting the second switches SW2. That is, signals S1, S2, ..., Sk-1 are supplied sequentially from the NMOS transistor connected to capacitor C2 to the gate electrode of the NMOS transistor connected to capacitor Cn.

Signals S1, S2, ..., Sk-1, Sk go high in this order: signals Sk, Sk-1, ..., S2, S1. Accordingly, first, the NMOS transistor constituting the first switch SW1 connected to capacitor Cn is turned on. Next, the MOS transistor constituting the second switch SW2 connected to capacitor Cn and the NMOS transistor constituting the first switch SW1 connected to capacitor Cn-1 (not shown) are turned on. Finally, the NMOS transistor constituting the second switch SW2 connected to capacitor C2 and the NMOS transistor constituting the first switch SW1 connected to capacitor C1 are turned on.

The operation timing of the NMOS transistors constituting the first and second switches SW1, SW2 is not limited to control performed by signals S1, S2, ..., Sk-1, Sk. For instance, all the NMOS transistors constituting the first and second switches SW1, SW2 may be turned on or off at the same time.

With the third embodiment, the first and second switches SW1, SW2 are composed of high-voltage NMOS transistors and Vdd+Vth is supplied from the booster 31 to the gate electrode of the corresponding NMOS transistor constituting a first switch SW1. Therefore, the first switch SW1 can supply the first power supply Vdd to each of the capacitors C1, ..., Cn without being influenced by the threshold voltage of the NMOS transistor. Accordingly, the step-up circuit of the third embodiment can generate a high voltage at high speed.

Fourth Embodiment

Figure 9:
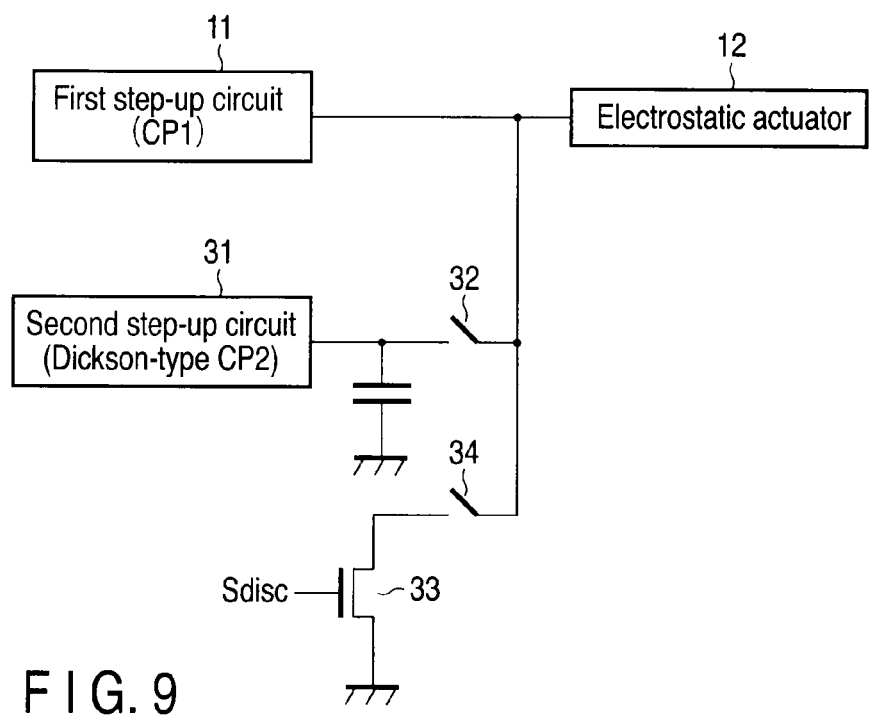
FIG. 9 schematically shows a configuration of a step-up circuit according to a fourth embodiment of the invention.

FIG. 9 shows a fourth embodiment of the invention. As described above, the electrostatic actuator 12 does not require a high voltage to keep the driven state after driving. Accordingly, the fourth embodiment uses a first step-up circuit (CP1) 11 of FIG. 1 and a second step-up circuit (CP2) of the Dickson type 31. At the time of driving, the fourth embodiment uses the first step-up circuit 11 to drive the actuator 12 and, after driving, uses the second step-up circuit 31 of the Dickson type to keep the driven state. That is, for example, a switch 32 is provided between the second step-up circuit 31 and the actuator 12. At the time of driving, when the switch 32 has been turned off and the first step-up circuit 11 has driven the actuator 12, the switch 32 is turned on. As a result, the second step-up circuit 31 is connected to the actuator 12. At this time, the first step-up circuit 11 may be disconnected from the actuator 12. A transistor 33, which is a discharging transistor, is connected to the actuator 12 via a switch 34.

With the fourth embodiment, when the actuator 12 is actuated, the first step-up circuit 11 whose configuration is the same as that of the step-up circuit of FIG. 1 generates a high voltage at high speed and drives the actuator 12. After the actuator 12 is driven, the second step-up circuit 31 which generates a voltage lower than that of the first step-up circuit 11 keeps the driven state. Accordingly, after the actuator 12 has been driven, the power consumption can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A voltage generating circuit comprising:
a plurality of capacitors each of which includes a first and a second electrode;
a plurality of first switches connected between the first electrodes of the plurality of capacitors and a first power supply;
a plurality of second switches connected between the second electrodes of the plurality of capacitors and a second power supply; and
a plurality of resistances each of which is connected between the first electrode of one of the plurality of capacitors and the second electrode of another capacitor and which connect the plurality of capacitors in series, wherein a voltage for driving an actuator is output from a last stage of the plurality of capacitors connected in series.

2. The circuit of claim 1, wherein, if a capacitance of one of said plurality of capacitors is C, a number of capacitors is n, a voltage of the first power supply is Vdd, a pull-in voltage of the actuator is $V_{PI}$, and an up state capacitance of the actuator is $C_{UP}$, the following expression holds:

$$C \times n \geq \frac{27}{8}\left(\frac{V_{PI}}{Vdd}\right)^2 C_{UP}$$

3. The circuit of claim 1, wherein, if a resistance of each of said plurality of resistances is R, an on resistance of each of the first and second switches is $R_{SW}$, a potential difference applied to each of the capacitors is ΔV, and a voltage of the first power supply is Vdd, a lower limit of the resistances of said plurality of resistances is expressed as:

$$R \geq 18 \cdot R_{SW}$$

if through current per capacitor is Ithr, Ithr is expressed by the following equation:

$$Ithr = \frac{Vdd}{R + 2R_{SW}}$$

and, if a through current of the n capacitors is Ilim, Ilim satisfies the following expression:

$$R \geq \frac{nVdd}{Ilim} - 2R_{SW}$$

4. The circuit of claim 1, wherein, if a resistance of each of said plurality of resistances is R and a parasitic capacitance of each of the capacitors is $C_P$, an upper limit of the resistances of said plurality of resistances is represented by the following expression:

$$R \leq 1 \text{ μsec}/C_P$$

5. The circuit of claim 1, wherein
said plurality of first switches comprises:
a plurality of fixed electrodes which are provided on an insulating film and which are connected to the first electrodes of said plurality of capacitors in a one-to-one correspondence;
a movable electrode which includes a first end to which the first power supply is supplied and a plurality of second ends serving as contacts, the first end being fixed to the insulating film and said plurality of second ends corresponding to said plurality of fixed electrodes in a one-to-one correspondence; and
driving electrodes which are provided between said plurality of fixed electrodes and the first end and which drive the movable electrode.

6. The circuit of claim 1, wherein each of said plurality of first switches is composed of a first MOS transistor, and each of said plurality of second switches is composed of a second MOS transistor.

7. The circuit of claim 6, further comprising: a booster circuit which is connected to a gate of the first MOS transistor and which generates a voltage higher than a power supply voltage by a threshold voltage of the first MOS transistor.

8. The circuit of claim 1, wherein the actuator comprises:
a first electrode;
an insulating film formed on the first electrode; and
a second electrode provided above the insulating film so as to be movable.

9. The circuit of claim 1, further comprising:
a Dickson-type charge pump circuit; and
a third switch which is connected between an output of the Dickson-type charge pump circuit and the actuator and which is turned off when the voltage generating circuit drives the actuator and, after the actuator is driven, is turned on to supply output voltage of the Dickson-type charge pump circuit to the actuator.

10. A driving system comprising:
a first step-up circuit; and
an actuator connected to the output end of the first step-up circuit, the first step-up circuit comprising:
a plurality of capacitors each of which includes a first and a second electrode;
a plurality of first switches connected between the first electrodes of the plurality of capacitors and a first power supply;
a plurality of second switches connected between the second electrodes of the plurality of capacitors and a second power supply; and
a plurality of resistances each of which is connected between the first electrode of one of the plurality of capacitors and the second electrode of another capacitor and which connect the plurality of capacitors in series, a voltage for driving an actuator being output from the output end at a last stage of the plurality of capacitors connected in series.

11. The system of claim 10, wherein, if a capacitance of one of said plurality of capacitors is C, a number of capacitors is n, a voltage of the first power supply is Vdd, a pull-in voltage of the actuator is $V_{PI}$, and an up state capacitance of the actuator is $C_{UP}$, the following expression holds:

$$C \times n \geq \frac{27}{8} \left(\frac{V_{PI}}{Vdd}\right)^2 C_{UP}$$

12. The system of claim 10, wherein, if a resistance of each of said plurality of resistances is R, an on resistance of each of the first and second switches is $R_{SW}$, a potential difference applied to each of the capacitors is ΔV, and a voltage first power supply is Vdd, a lower limit of the resistances of said plurality of resistances is expressed as:

$$R \leq 18 \cdot R_{SW}$$

if through current per capacitor is Ithr, Ithr is expressed by the following equation:

$$Ithr = \frac{Vdd}{R + 2R_{SW}}$$

and, if through current in an n number of capacitors is Ilim, Ilim satisfies the following expression:

$$R \geq \frac{nVdd}{Ilim} - 2R_{SW}$$

13. The system of claim 10, wherein, if a resistance of each of said plurality of resistances is R and a parasitic capacitance of each of the capacitors is $C_P$, an upper limit of the resistances of said plurality of resistances is represented by the following expression:

$$R \leq 1 \text{ μsec}/C_P$$

14. The system of claim 10, wherein
said plurality of first switches comprises:
a plurality of fixed electrodes which are provided on an insulating film and which are connected to the first electrodes of said plurality of capacitors in a one-to-one correspondence;
a movable electrode which has a first end to which the first power supply is supplied and a plurality of second ends serving as contacts, the first end being secured onto the insulating film and said plurality of second ends being caused to correspond to said plurality of fixed electrodes in a one-to-one correspondence; and
driving electrodes which are provided between said plurality of fixed electrodes and the first end and which drive the movable electrode.

15. The system of claim 10, wherein each of said plurality of first switches is composed of a first MOS transistor, and each of said plurality of second switches is composed of a second MOS transistor.

16. The system of claim 15, further comprising: a booster which is connected to a gate of the first MOS transistor and which generates a voltage higher than a power supply voltage by a threshold voltage of the first MOS transistor.

17. The system of claim 10, wherein the actuator comprises:
- a first electrode;
- an insulating film formed on the first electrode; and
- a second electrode provided above the insulating film so as to be movable.

18. The system of claim 10, further comprising:
a second step-up circuit of the Dickson type; and
a third switch which is connected between an output of the second step-up circuit and the actuator and which is turned off when the first step-up circuit drives the actuator and, after the actuator is driven, is turned on to supply output voltage of the second step-up circuit of the Dickson type to the actuator.

* * * * *